(12) United States Patent
Nasrallah et al.

(10) Patent No.: US 12,213,020 B2
(45) Date of Patent: Jan. 28, 2025

(54) IDENTIFICATION OF A MOBILE DEVICE BASED ON A PROXIMATE NETWORK

(71) Applicant: FORD GLOBAL TECHNOLOGIES, LLC, Dearborn, MI (US)

(72) Inventors: Hussein F. Nasrallah, Dearborn Heights, MI (US); James Carl, Royal Oak, MI (US); Fuyi Wang, Canton, MI (US); Mifta Ahmed, Sterling Heights, MI (US); David Anthony Hatton, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 17/747,644

(22) Filed: May 18, 2022

(65) Prior Publication Data

US 2023/0379654 A1    Nov. 23, 2023

(51) Int. Cl.
*H04W 4/021* (2018.01)
*H04W 4/029* (2018.01)
*H04W 4/40* (2018.01)

(52) U.S. Cl.
CPC .......... *H04W 4/021* (2013.01); *H04W 4/029* (2018.02); *H04W 4/40* (2018.02)

(58) Field of Classification Search
CPC ........ H04W 4/021; H04W 4/029; H04W 4/40
See application file for complete search history.

(56) References Cited

U.S. PATENT DOCUMENTS

| 8,618,956 | B2 | 12/2013 | Bragagnini et al. | |
| 9,338,597 | B2 * | 5/2016 | Abu-Hakima | H04W 4/021 |
| 10,291,710 | B2 * | 5/2019 | Sabbaghian | H04L 67/12 |
| 2014/0328248 | A1 * | 11/2014 | Greubel | H04W 8/005 370/328 |
| 2015/0296441 | A1 * | 10/2015 | Elnajjar | H04W 48/10 370/312 |
| 2015/0382160 | A1 * | 12/2015 | Slay, Jr. | H04W 4/029 455/466 |
| 2023/0298460 | A1 * | 9/2023 | Cui | G08G 1/0145 701/118 |

FOREIGN PATENT DOCUMENTS

DE   102017107730 A1 * 10/2018
EP   3660801 A1    6/2020

* cited by examiner

*Primary Examiner* — Adnan Aziz
*Assistant Examiner* — James E Munion
(74) *Attorney, Agent, or Firm* — Joseph Zane; Brooks Kushman P.C.

(57) ABSTRACT

A system includes a vehicle configured to detect a predefined vehicle incident and report the vehicle incident to at least one remote server, the report including a unique vehicle identifier and a unique wireless identifier associated with the vehicle. The system also includes the server, configured to determine a plurality of devices previously paired with the vehicle and send the unique wireless identifier to at least one of the plurality of devices. The system also includes the plurality of devices, configured to receive the unique wireless identifier. The plurality of devices are also configured to wirelessly search for a signal including the unique wireless identifier and, responsive to detecting the signal, present assistance instructions associated with the incident.

17 Claims, 2 Drawing Sheets

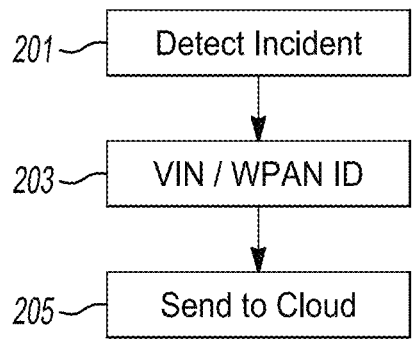
_Fig-2_
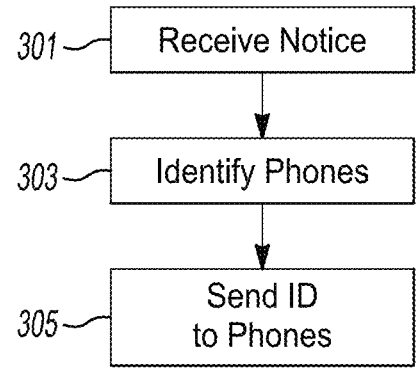
_Fig-3_
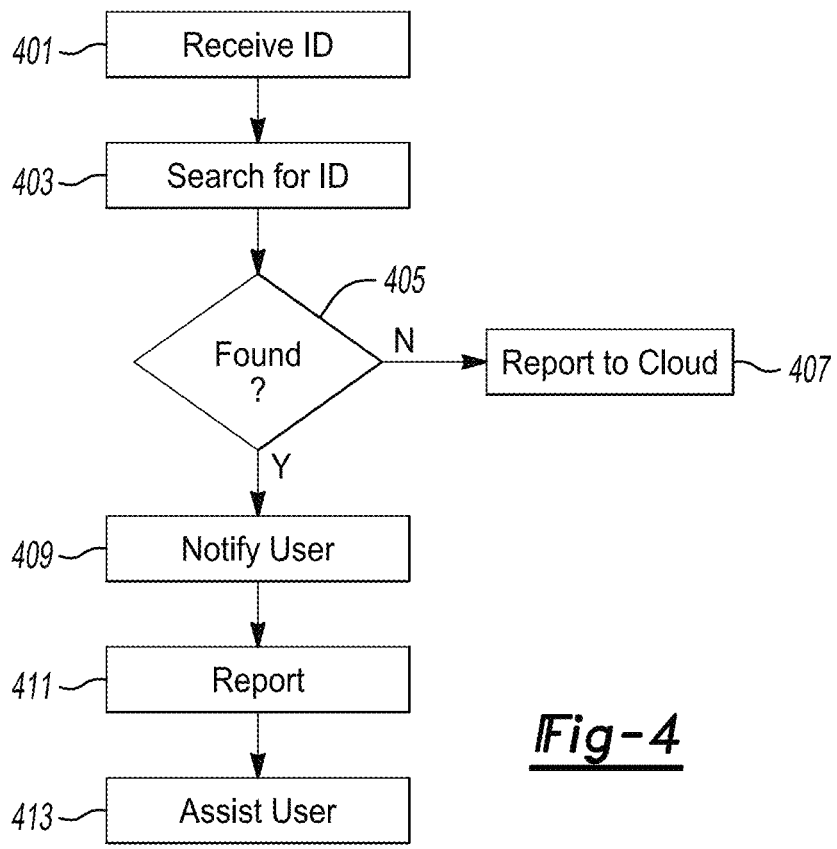
_Fig-4_

IDENTIFICATION OF A MOBILE DEVICE BASED ON A PROXIMATE NETWORK

TECHNICAL FIELD

The illustrative embodiments generally relate to identification of a mobile device based on a proximate network.

BACKGROUND

Vehicles include the capability to pair many devices, via, for example, BLUETOOTH connections. Each paired device is a unique device, which may or may not be possessed by distinct users. Many devices may be paired with a single vehicle, and in the event of an incident, those devices are indicative of the possessors that may be present.

At the same time, many or some of the devices may belong to people not present at the incident. When the incident occurs, there may be a desire to send assistance instructions to those present. Incidents can be disruptive for vehicle occupants, and mobile assistance, such as follow up instructions, may be useful to help people who are disoriented. At the same time, sending such instructions or guidance to a previously paired, but not present, device, may result in causing undue alarm with a third party. Incident detection can be triggered by a variety of factors, not all of which are severe, but if a third party receives incident guidance, with no context for the incident because they were not present, they may worry unnecessarily. Thus, it may not be the best solution to simply send guidance to every device having ever been paired with a vehicle, without any knowledge of whether a given device was present at the incident and therefore is an intended recipient device.

SUMMARY

In a first illustrative embodiment, a system includes at least one vehicle processor configured to detect a predefined vehicle incident and report the vehicle incident to at least one remote server, the report including a unique vehicle identifier and a unique wireless identifier associated with the vehicle. The system also includes the server, configured to determine a plurality of devices previously paired with the vehicle and send the unique wireless identifier to at least one of the plurality of devices. The system also includes the plurality of devices, configured to receive the unique wireless identifier. The plurality of devices are also configured to wirelessly search for a signal including the unique wireless identifier and, responsive to detecting the signal, present assistance instructions associated with the incident.

In a second illustrative embodiment, a system includes one or more mobile device processors configured to receive a unique wireless identifier associated with a vehicle wireless signal. The one or more processors are also configured to, responsive to receiving the identifier, search for the vehicle wireless signal associated with the unique wireless identifier and, responsive to detecting the signal, presenting assistance instructions on the mobile device for an incident reported by a vehicle that also transmits the wireless signal.

In a third illustrative embodiment, a method includes receiving a unique wireless identifier associated with a vehicle wireless signal. The method also includes, responsive to receiving the identifier, searching for the vehicle wireless signal associated with the unique wireless identifier, and, responsive to detecting the signal, presenting assistance instructions on the mobile device for an incident reported by a vehicle that also transmits the wireless signal.

BRIEF DESCRIPTION OF THE DRAWINGS

FIG. 2 shows an illustrative incident report process;

FIG. 3 shows an illustrative device verification process; and

FIG. 4 shows an illustrative device confirmation process.

DETAILED DESCRIPTION

Figure 1:
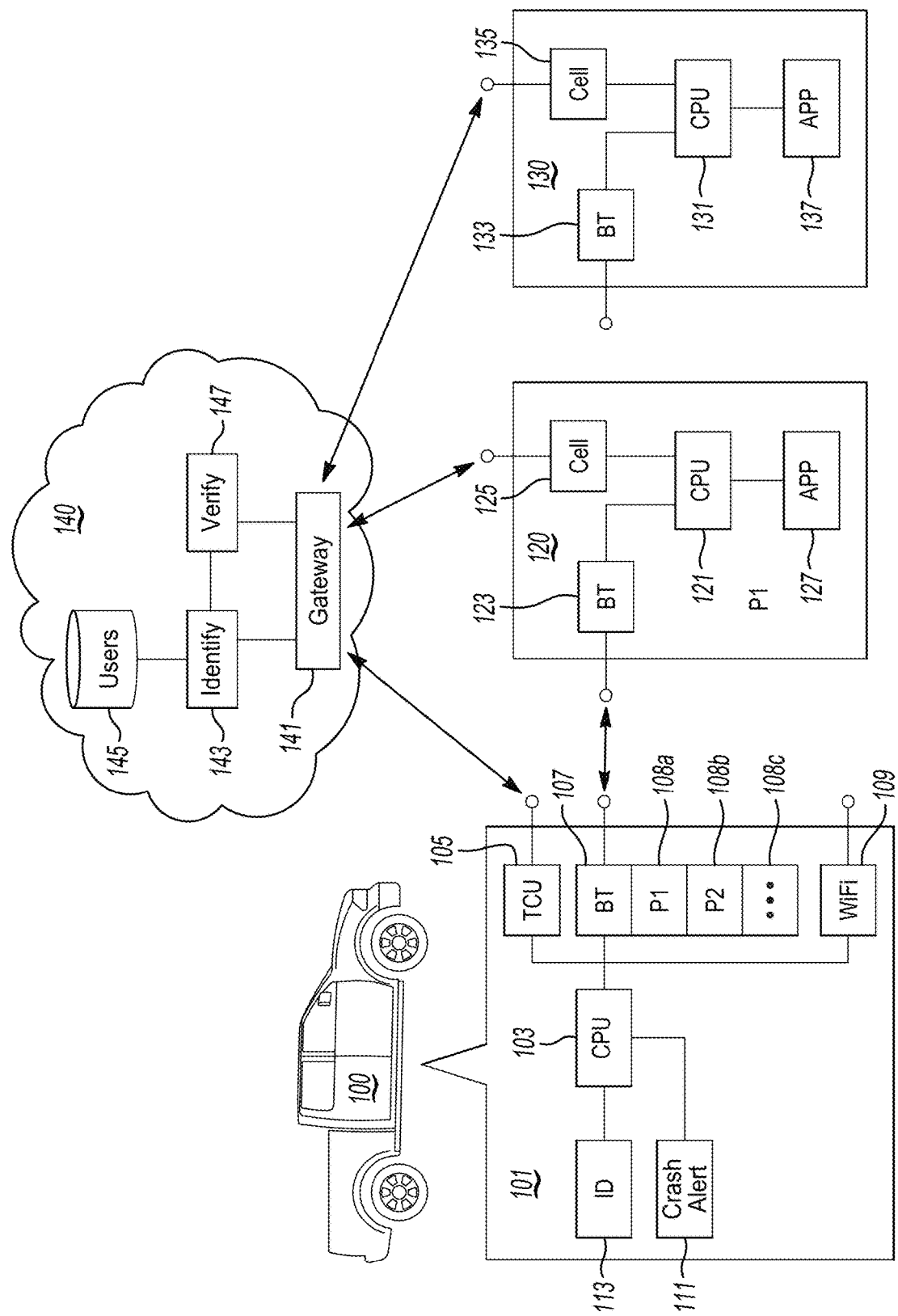
FIG. 1 shows an illustrative example of a system for incident reporting and device presence verification.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose a solution leveraging the unique network ID assigned to or generatable by a vehicle 100 involved in an incident. The vehicle 100 could uniquely identify itself in any reasonable manner, the idea is that devices which are not close enough to communicate with the vehicle cannot confirm that they "see" the unique ID, and therefore those devices were probably not present at the incident.

FIG. 1 shows an illustrative example of a system for incident reporting and device presence verification. In this example, the vehicle 100 includes an onboard computing system 101 with a CPU 103 connected to a variety of possible wireless transceivers. These may include, for example, a telematics control unit (TCU) 105, a BLUETOOTH connection 107, a Wi-Fi connection 109, etc. The vehicle may have one or more unique IDs associated with one or more connections. The IDs can include wireless personal area network (WPAN) IDs such as, but not limited to, a UUID, BSSID, BLUETOOTH Mac Address, etc.

There may also be a number of personal devices P1 108a, P2 108b, PX 10c, that have been previously paired with the vehicle 100. Even if one device had an active connection at the time of the incident, it may not be clear whether other devices were also present (and thus, presumably, the owners of those devices were also present).

The vehicle 100 may includes multiple incident detection processes 111, which can include any incident for which assistance to a mobile phone may be automatically rendered, among other things. The vehicle 100 may also include an ID reporting process 113 that can report one or more unique IDs to the cloud 140 upon incident detection.

User mobile devices 120 may include, for example, a CPU 121, a BLUETOOTH and/or other wireless transceivers 123, a cell antenna 125 and one or more applications provided by an original equipment manufacturer (OEM) or designed to work in conjunction with an aspect of or related to the illustrative embodiments. A second device 130 is also shown in FIG. 1, wherein the first device 120 is present at an incident and the second device 130 is not, for illustrative purposes. The second device 130 also includes a CPU 131, a BLUETOOTH and/or other wireless transceiver 133, a cell antenna 135 and an OEM application 137.

In one conventional model, not knowing which devices 120, 130 were present at the incident, the cloud may send assistance messaging to the applications 127, 137 on both devices if the vehicle 100 reported an incident. Since the possessor of device 130 was not present at the incident in this example, that person may become alarmed, lacking the context for the incident. Further, they may attempt to call the person possessing device 120, which may be beneficial at some point, but which may be disruptive in other instances as the person possessing device 120 may be attempting to sort out the aftermath of the incident.

The cloud 140 may include a gateway process 141 for data and connections handling, and may receive a report from a vehicle 100 about an incident. Using the VIN, the cloud 140 may identify all devices known to have been paired with vehicle 100, using an identification process 143. This information may be stored, for example, in a users database 145, or may even be provided by the vehicle 100 with an incident report. The cloud 140 may also include a verification process, which allows for verification of which devices 120, 130 were present at the incident. Additionally or alternatively, assistance instructions or a trigger for activating assistance instructions already present in an app 127, 137 may be sent to the verified devices, or may be sent to all devices with a requirement that the device 127, 137 verify vehicle proximity prior to presenting the instructions.

FIG. 2 shows an illustrative incident report process. In this example, the vehicle 100 detects an incident at 201, which would be, for example, a predefined incident that may trigger automatic assistance from an application on a mobile device, under certain defined circumstances. This could include, for example, deployment of a vehicle system triggering automated assistance, or a combination of a low tire pressure and a vehicle being stopped roadside (or simply excessively low tire pressure). The incident does not have to be dire, but in either of the preceding instances a message to the wrong device could cause undue concern for someone who was not present. Of course, the possessor of the device that is present could always elect to notify others, and parents may override the selective deployment feature in order to monitor a child, but the embodiments propose at least one system that can selectively administer assistance by confirming presence of the device at the location of the vehicle prior to at least presentation, if not delivery, of the assistance on the mobile device.

In this example, following incident detection, the vehicle 100 has an embedded modem 105 that assembles at least a VIN and a WPAN or other identifier at 203 and sends this information to the cloud 140 at 205. The information could also include a list of paired devices, another unique identifier, or any other relevant information as desired.

FIG. 3 shows an illustrative device verification process. When the cloud 140 receives the VIN at 301, and assuming the list of paired devices was not included in the received transmission, the cloud 140 can lookup the list of paired devices at 303, which can include query of a remote database storing such information in conjunction with a VIN. If desired, the received information can also include the ID of any device directly connected at time of incident, so that the cloud 140 can immediately verify the presence of at least one device 120.

To determine the presence of other devices, the cloud 140 distributes the unique WPAN (or other) ID to the mobile devices 120, 130, etc. that have previously been paired at 305. This transmission can be to, for example, the applications 127, 137 residing on the mobile devices 120, 130.

FIG. 4 shows an illustrative device confirmation process. The mobile devices 120, 130 receive, via the applications 127, 137, for example, the WPAN ID and instructions to detect the ID if possible. Alternatively, the applications may receive the ID and understand via onboard instructions to what use the ID is to be put.

The applications 127, 137 search for the WPAN that has the corresponding WPAN ID. If the device is in detection range, i.e., if it can communicate with the WPAN, then it is likely that the device was present at the incident. If the device is not in detection range, then the device should not see the WPAN having the WPAN ID. This allows for a fast sort of which devices are proximate to the vehicle 100 experiencing the incident.

If the WPAN ID is found at 405, the application 127 may notify the user that assistance is forthcoming at 409. The application may also report the presence of the device at 411, so that the cloud can send further instructions and/or dispatch services for that user as needed, based on any prior knowledge about the user. Then the cloud will send assistance instructions which can be relayed at 413 or the device 120 will activate already-present assistance instructions tuned to the incident at hand.

If the WPAN ID is not found (e.g., device 130 is not present) at 405, the application 137 will report to the cloud that the device is not present. At that moment in time, in this example, the device 130 will forego any notification to the user until instructed by the cloud, if such instruction ever comes. For example, the device 130 may notify the user after a predetermined time period, or when further information is available, or when the user of device 120 requests notification, or never.

By quickly determining which devices 120, 130 are present at an incident based on detection of a unique vehicle ID by the device(s) 120, 130 that are present, identification and verification of select devices for selective delivery can be achieved.

Further, devices determined to be on-site can be logged and noted for an EMS technician, for example. That is, if the vehicle determines that there are 3 devices "on-site" as discussed above, the vehicle could further enable communication through a medium allowing for distance detection, which may indicate a proximity of each device to the vehicle. This could involve, for example, received signal strength indicator (RSSI) or other similar technology. Then, the EMS technician could be informed that while 3 devices are detected on-site, one appears to be some distance from the vehicle and may represent a user who has been similarly dislocated. Vectoring may also be possible to aid in guidance of the technician, depending on the detection format used.

Similarly, the vehicle WPAN ID can be passed to EMS technicians who can use their own device to search for the WPAN ID, helping locate vehicles that may be hidden in ditches or by debris in the dark, for example. The EMS device can notify the EMS technician when the WPAN ID is detected and lost and this can be used to at least pseudo-triangulate a vehicle location. Additionally or alternatively, the EMS technician may have permissioning allowing the EMS device to connect to the vehicle using the WPAN once detected and instruct flashing of lights or sounding of a vehicle audible output.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   at least one vehicle processor configured to:
      detect a predefined vehicle incident;
      report the vehicle incident to at least one remote server, the report including a unique vehicle identifier and a unique wireless identifier associated with the vehicle;
   the server, configured to:
      determine a plurality of devices previously paired with the vehicle;
      send the unique wireless identifier to at least one of the plurality of devices;
   the plurality of devices, configured to:
      receive the unique wireless identifier, including receipt of assistance instructions;
      wirelessly search for a signal including the unique wireless identifier; and
      responsive to detecting the signal, present the assistance instructions associated with the incident.

2. The system of claim 1, wherein the unique vehicle identifier includes a vehicle identification number and the unique wireless identifier includes a wireless personal area network identifier.

3. The system of claim 1, wherein the server is configured to determine the plurality of devices based on a remotely stored associated of the plurality of devices with the unique vehicle identifier.

4. The system of claim 1, wherein the instructions are stored on each of the plurality of devices and predefined for respective varied incidents.

5. The system of claim 1, wherein the plurality of wireless devices are further configured to:
   responsive to detecting the signal, report the detection of the signal to the server; and
   responsive to reporting the detection, receive the instructions from the server.

6. The system of claim 1, wherein the plurality of devices are further configured to report non-detection of the signal responsive to not detecting the signal.

7. A system comprising:
   one or more mobile device processors configured to:
      receive a unique wireless identifier associated with a vehicle wireless signal, including receipt of assistance instructions;
      responsive to receiving the identifier, search for the vehicle wireless signal associated with the unique wireless identifier; and
      responsive to detecting the signal, presenting the assistance instructions on the mobile device for an incident reported by a vehicle that also transmits the wireless signal.

8. The system of claim 7, wherein the unique wireless identifier includes a wireless personal area network identifier for a network of the vehicle.

9. The system of claim 7, wherein the assistance instructions are stored on the device and predefined for respective varied incidents.

10. The system of claim 7, wherein the one or more processors are further configured to:
   responsive to detecting the signal, report the detection of the signal to the server; and
   responsive to reporting the detection, receive the assistance instructions from the server.

11. The system of claim 7, wherein the one or more processors are further configured to report non-detection of the signal responsive to not detecting the signal.

12. A method comprising:
   receiving a unique wireless identifier associated with a vehicle wireless signal, including receipt of assistance instructions;
   responsive to receiving the identifier, searching, using a mobile device, for the vehicle wireless signal associated with the unique wireless identifier; and
   responsive to detecting the signal, presenting the assistance instructions on the mobile device for an incident reported by a vehicle that also transmits the wireless signal.

13. The method of claim 12, wherein the unique wireless identifier includes a wireless personal area network identifier for a network of the vehicle.

14. The method of claim 12, wherein the assistance instructions are stored on the device and predefined for respective varied incidents.

15. The method of claim 12, wherein the one or more processors are further configured to:
   responsive to detecting the signal, report the detection of the signal to the server; and
   responsive to reporting the detection, receive the assistance instructions from the server.

16. The method of claim 12, wherein the one or more processors are further configured to report non-detection of the signal responsive to not detecting the signal.

17. The method of claim 12, further comprising:
   responsive to detecting the signal, communicating with the vehicle, from the mobile device, using a signal that allows the vehicle to determine at least one of a distance to or direction from the vehicle of the mobile device.

* * * * *